(No Model.)

W. C. HOMAN.
LAMP BRACKET.

No. 581,991. Patented May 4, 1897.

WITNESSES:
Frank S. Obin
James S. Oswald.

INVENTOR:—
William C. Homan.

BY
R. Aunichell
ATTORNEY

United States Patent Office.

WILLIAM C. HOMAN, OF MERIDEN, CONNECTICUT, ASSIGNOR TO THE EDWARD MILLER & COMPANY, OF SAME PLACE.

LAMP-BRACKET.

SPECIFICATION forming part of Letters Patent No. 581,991, dated May 4, 1897.

Application filed February 27, 1897. Serial No. 625,317. (No model.)

*To all whom it may concern:*

Be it known that I, WILLIAM C. HOMAN, a citizen of the United States, residing at Meriden, in the county of New Haven and State of Connecticut, have invented certain new and useful Improvements in Lamp-Brackets, of which the following is a full, clear, and exact description.

My invention relates to improvements in lamp-brackets; and it consists in the novel construction and arrangement of the parts thereof, hereinafter fully described.

The object of my invention is to provide a simple and inexpensive means of neat appearance for securing a lamp or lantern in a suitable position upon the frame of a bicycle or other vehicle, which means may be quickly and easily attached to the frame of said vehicle at various points, as desired.

My invention is illustrated by the accompanying drawings, in which—

Figure 1:
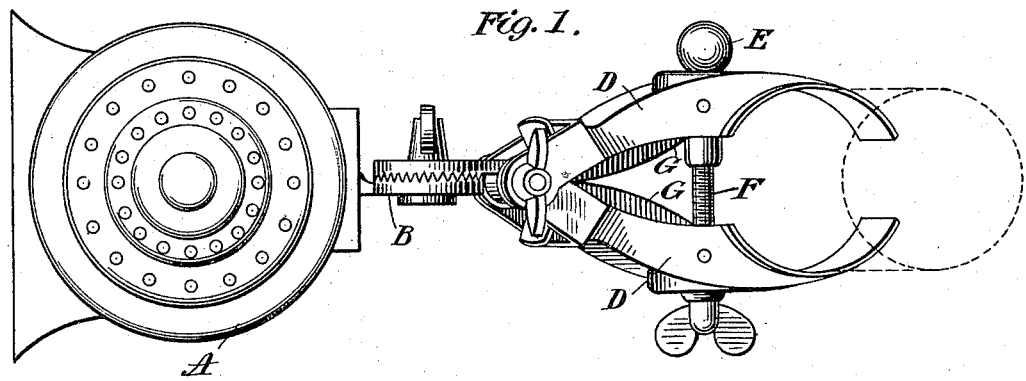
Figure 2:
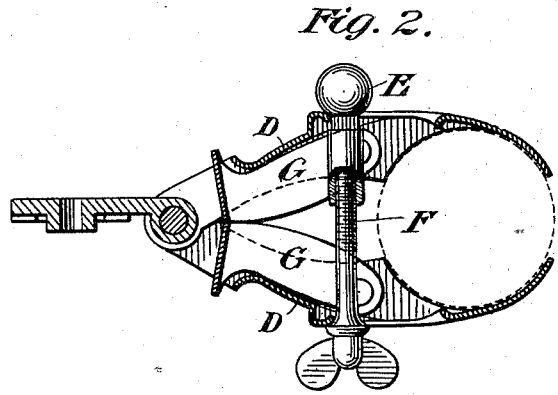
Figure 3:
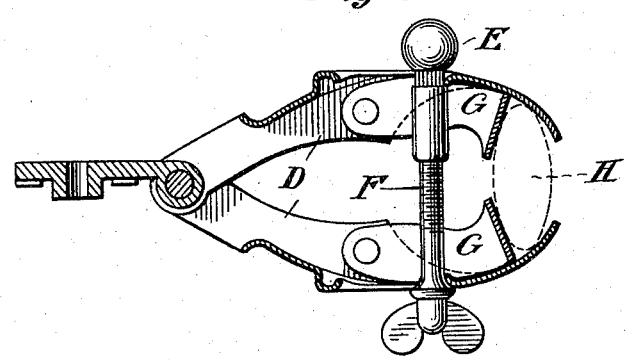

Figure 1 is a plan view, the bracket portion being somewhat in perspective. Fig. 2 is a horizontal section of Fig. 1, the lamp portion being removed. Fig. 3 is a similar view illustrating some of the parts in a different position.

Similar letters refer to similar parts.

A is a lamp. B is a rearward extension from said lamp, by which the same may be secured to the clamping members of the bracket proper in any desired manner.

D D are the main clamping members suitably connected at one end and adapted at their free extremities, as shown in Figs. 1 and 2, to embrace a substantially cylindrical body, such as, for instance, the front-fork tube or head of a bicycle. Suitable means are provided for operating said clamping members, causing them to firmly engage the desired portion of the frame, the means illustrated being an internally-threaded nut E, carried by one of the main clamping members D D, and an externally-threaded screw F, carried by the other member and operating with the said nut E to draw the said clamping members toward each other.

As previously indicated, the free extremities of the main clamping members D D are shaped to embrace substantially rounded or cylindrical bodies, such as the head of a bicycle. In practice, however, it is sometimes desirable to attach the lamp to one of the fork-blades of a bicycle, and therefore I provide suitable means whereby the shape of the clamping members may be so modified as to embrace somewhat angular bodies, such as, for instance, the front-fork blade of a bicycle.

G G are wings by preference pivotally supported within the main clamping members D D, and when in inoperative position the said wings G G are sheathed within recesses by preference formed by corrugations in the said main clamping members D D. (See Figs. 1 and 2.) These wings are so connected to the main clamping members D D that when swung from the position indicated in Fig. 2 to the position indicated in Fig. 3 the free extremities of the said wings will form, toward the inner free extremities of the main clamping members, recesses of somewhat angular form particularly adapted to embrace somewhat angular bodies, such as, for instance, the front-fork blade H of a bicycle.

In operation, should it be desired to attach the lamp to the fork-blade of a bicycle, the wings G G appear in the position indicated in Fig. 3. To adapt the clamping members so as to embrace the head of a bicycle, the screw F is disengaged from the nut E, so that the main clamping members D D may be swung open and the position of the wings G G reversed, so that they will lie in the position indicated in Fig. 2. The clamping means for drawing together the clamping members in Fig. 3 are shown to be in a forward position, slots in the sides of the main clamping members D D permitting the same to be shifted forwardly or rearwardly, thus permitting the screw to exert its power at a point close to the bearing-support. In Fig. 2 the nut E and screw F are shown to be in suitable position to permit the clamping members to embrace the substantially cylindrical body referred to.

When the parts are in the position indicated in Fig. 2, the adjacent edges of the wings G G by preference rest against each other, as shown, thus preventing looseness or rattling of the parts, although manifestly other means may be provided to accomplish this end.

In carrying out my invention some changes in the construction shown and described may be desirable, and I therefore do not limit myself to the specific construction shown and described, but hold myself at liberty to make such variations and changes as are fairly within the spirit and scope of my invention.

What I claim is—

1. In a lamp-bracket, for the purpose described, main clamping-arms, inside supplemental arms or wings pivoted to and between said main clamping-arms, and means for drawing said clamping members toward each other, substantially as described.

2. In a lamp-bracket, for the purpose described, main clamping members, depressions toward the outer end of said clamping members adapted to engage rounded bodies, wings pivoted intermediate in the length of said main clamping members, substantially as described.

3. In a lamp-bracket, for the purpose described, main clamping-arms having depressions at their outer or free ends, wings pivotally connected to said main clamping-arms at a point intermediate at their length, corrugations in said main clamping-arms to sheathe said wings when the latter are in their inoperative position, substantially as described.

WILLIAM C. HOMAN.

Witnesses:
CHAS. E. HOMAN,
A. F. YEAMANS.